United States Patent
Reuven

(10) Patent No.: US 9,715,157 B2
(45) Date of Patent: Jul. 25, 2017

(54) VOLTAGE CONTROLLED OPTICAL DIRECTIONAL COUPLER

(71) Applicant: Corning Optical Communications Wireless Ltd, Airport (IL)

(72) Inventor: Rami Reuven, Rishon Letzion (IL)

(73) Assignee: Corning Optical Communications Wireless Ltd, Airport (IL)

( * ) Notice: Subject to any disclaimer, the term of this patent is extended or adjusted under 35 U.S.C. 154(b) by 31 days.

(21) Appl. No.: 14/962,383

(22) Filed: Dec. 8, 2015

(65) Prior Publication Data

US 2016/0085136 A1 Mar. 24, 2016

Related U.S. Application Data

(63) Continuation of application No. PCT/IL2014/050535, filed on Jun. 12, 2014.

(60) Provisional application No. 61/834,066, filed on Jun. 12, 2013, provisional application No. 61/894,129, filed on Oct. 22, 2013.

(51) Int. Cl.
*G02B 6/26* (2006.01)
*G02F 1/313* (2006.01)
*G02B 6/28* (2006.01)

(52) U.S. Cl.
CPC ......... *G02F 1/3132* (2013.01); *G02B 6/2808* (2013.01); *G02F 1/313* (2013.01); *G02F 2201/16* (2013.01)

(58) Field of Classification Search
None
See application file for complete search history.

(56) References Cited

U.S. PATENT DOCUMENTS 3,824,597 A * 7/1974 Berg ............... H04B 10/11
370/215
4,302,071 A 11/1981 Winzer
(Continued)

FOREIGN PATENT DOCUMENTS

AU 645192 B 10/1992
AU 731180 B2 3/1998
(Continued)

OTHER PUBLICATIONS

Patent Cooperation Treaty International Search Report for application No. PCT/IL2014/050535, dated Sep. 30, 2014, 4 pages.
(Continued)

*Primary Examiner* — Uyen Chau N Le
*Assistant Examiner* — Chris Chu
(74) *Attorney, Agent, or Firm* — C. Keith Montgomery

(57) ABSTRACT

A voltage controlled optical directional coupler (VCODC) having a coupling ratio that can be adjusted to any desired value through voltage tuning is disclosed. The VCODC may include a first optical hybrid coupler and a second optical hybrid coupler, which may be coupled with each other via one or more voltage controlled optical elements having a variable transparency depending on a voltage applied to the one or more voltage controlled optical elements. The VCODC may be configured to divert a portion of optical power received to a trunk input of the VCODC to a tap output of the VCODC based on the variable coupling ratio of the VCODC, which may be dependent on the variable transparency of the one or more voltage controlled optical elements.

23 Claims, 6 Drawing Sheets

(56) References Cited

U.S. PATENT DOCUMENTS

| | | |
|---|---|---|
| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,268,980 A | 12/1993 | Yuuki |
| 5,278,690 A | 1/1994 | Vella-Coleiro |
| 5,278,923 A | 1/1994 | Nazarathy et al. |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,943,453 A * | 8/1999 | Hodgson ............... G02F 1/3517 385/16 |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,222,965 B1 | 4/2001 | Smith |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |

(56) References Cited

U.S. PATENT DOCUMENTS

| | | |
|---|---|---|
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,706 B2 | 3/2004 | Kambe |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,775,427 B2 | 8/2004 | Evans |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,838,738 B1 * | 1/2005 | Costello ............... G02B 6/266 257/414 |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |

(56) References Cited

U.S. PATENT DOCUMENTS

| | | |
|---|---|---|
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,302,140 B2 | 11/2007 | Nashimoto |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,213,401 B2 | 7/2012 | Fischer et al. |
| 8,223,795 B2 | 7/2012 | Cox et al. |
| 8,238,463 B1 | 8/2012 | Arslan et al. |
| 8,270,387 B2 | 9/2012 | Cannon et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |

(56) References Cited

U.S. PATENT DOCUMENTS

| | | |
|---|---|---|
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,750,173 B2* | 6/2014 | Knox ............... H04L 12/40013 370/278 |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 2001/0024545 A1* | 9/2001 | Sorin ............... G02B 6/02071 385/28 |
| 2001/0033710 A1* | 10/2001 | Kim ............... H04J 14/0221 385/28 |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0085811 A1* | 7/2002 | Kambe ............... G02F 1/3136 385/41 |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0185884 A1 | 8/2005 | Haus et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0257065 A1 | 11/2006 | Coldren et al. |
| 2006/0257073 A1 | 11/2006 | Nashimoto |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |

(56) References Cited

U.S. PATENT DOCUMENTS

| | | |
|---|---|---|
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0263953 A1 | 11/2007 | Thalliya et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0144989 A1 | 6/2008 | Sakurai |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0220240 A1* | 9/2009 | Abhari .................. B82Y 20/00 398/81 |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |

(56) References Cited

U.S. PATENT DOCUMENTS

| | | |
|---|---|---|
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2014/0016583 A1 | 1/2014 | Smith |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0964290 A1 | 5/1999 |
| EP | 0993124 A2 | 4/2000 |
| EP | 1037411 A2 | 9/2000 |
| EP | 1179895 A1 | 2/2002 |
| EP | 1241515 A2 | 3/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2095419 A | 9/1982 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007065227 A | 3/2007 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |

(56) References Cited

FOREIGN PATENT DOCUMENTS

| | | |
|---|---|---|
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2010090999 A1 | 8/2010 |
| WO | 2010132739 A1 | 11/2010 |
| WO | 2011023592 A1 | 3/2011 |
| WO | 2011100095 A1 | 8/2011 |
| WO | 2011139939 A1 | 11/2011 |
| WO | 2012148938 A1 | 11/2012 |
| WO | 2012148940 A1 | 11/2012 |
| WO | 2013122915 A1 | 8/2013 |

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, Date Unknown, 11 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

(56) References Cited

OTHER PUBLICATIONS

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/ Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Examination Report for European Patent Application No. 14734911.2, mailed Mar. 21, 2017, 6 pages.

\* cited by examiner

VOLTAGE CONTROLLED OPTICAL DIRECTIONAL COUPLER

CROSS-REFERENCE TO RELATED APPLICATIONS

This application is a continuation of International Application No. PCT/IL14/050535 filed on Jun. 12, 2014, which claims the benefit of priority to U.S. Provisional Application No. 61/834,066, filed on Jun. 12, 2013, and Provisional Application No. 61/894,129, filed on Oct. 22, 2013, the contents of which are relied upon and incorporated herein by reference in their entireties.

BACKGROUND

The disclosure relates generally to couplers that can be used in optical communication technology and more particularly to a voltage controlled optical directional coupler and associated systems and operating methods, which may be used in optical communication networks, such as fiber optic networks.

No admission is made that any reference cited herein constitutes prior art. Applicant expressly reserves the right to challenge the accuracy and pertinency of any cited reference.

SUMMARY

A first embodiment of the disclosure relates to a voltage controlled optical directional coupler. The voltage controlled optical directional coupler (VCODC) of this embodiment may include a first optical hybrid coupler, which may include a trunk input of the voltage controlled optical directional coupler. The VCODC of the first embodiment may further include a second optical hybrid coupler, which may be coupled with a tap output of the VCODC, and one or more voltage controlled optical elements configured to couple the first optical hybrid coupler to the second optical hybrid coupler. The one or more voltage controlled optical elements may have a variable transparency depending on a voltage applied to the one or more voltage controlled optical elements. The VCODC may be configured to divert a portion of optical power received to the trunk input to the tap output based on a variable coupling ratio of the VCODC. The portion of optical power that is diverted may be dependent on the variable transparency of the one or more voltage controlled optical elements.

A second embodiment relates to a method for operating a VCODC. The VCODC that may be used in the method of the second embodiment may include a first optical hybrid coupler, which may include a trunk input of the VCODC, and a second optical hybrid coupler coupled with a tap output of the VCODC. The first optical hybrid coupler may be coupled with the second optical hybrid coupler via one or more voltage controlled optical elements having a variable transparency depending on a voltage applied to the one or more voltage controlled optical elements. The method may include setting a target optical power at the tap output ($P_{OPT\ TAP}$) for the VCODC. A portion of optical power received to the trunk input may be diverted to the tap output based on a variable coupling ratio of the VCODC. The portion of optical power that is diverted may be dependent on the variable transparency of the one or more voltage controlled optical elements. The method may further include observing an actual $P_{OPT\ TAP}$ during operation of the VCODC, and determining whether the actual $P_{OPT\ TAP}$ is equal to the target $P_{OPT\ TAP}$. The method may also include adjusting the variable coupling ratio of the VCODC to achieve the $P_{OPT\ TAP}$ by tuning the voltage applied to the one or more voltage controlled optical elements in an instance in which the actual $P_{OPT\ TAP}$ is not equal to the target $P_{OPT\ TAP}$.

A third embodiment relates to a system including a VCODC. The system may be, for example, an optical network, such as a fiber optic network in which a VCODC in accordance with various embodiments may be implemented. The VCODC included in the system of the third embodiment may be the VCODC of the first embodiment. The system of the third embodiment may further include a control loop that may be configured to adjust the variable coupling ratio of the VCODC to achieve a target optical power at the tap output ($P_{OPT\ TAP}$) by tuning a voltage that may be applied to one or more voltage controlled optical elements of the VCODC in an instance in which an observed $P_{OPT\ TAP}$ is not equal to the target $P_{OPT\ TAP}$. The system may additionally include processing circuitry configured to set the target $P_{OPT\ TAP}$.

Additional features and advantages will be set forth in the detailed description, and will be readily apparent to those skilled in the art.

The foregoing general description and the detailed description are merely exemplary, and are intended to provide an overview or framework to understand the nature and character of the claims.

The accompanying drawings constitute a part of this specification. The drawings each illustrate one or more embodiments, and together with the description serve to explain principles and operation of the various embodiments.

DETAILED DESCRIPTION

Figure 1:
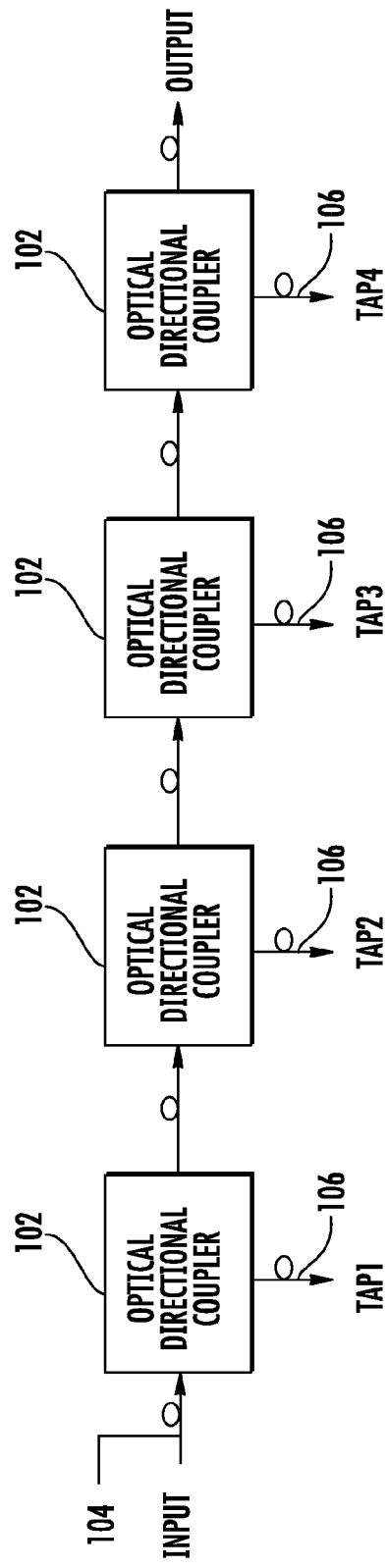
FIG. 1 illustrates an optical daisy chain power distribution system based on optical directional couplers (VCODC).

An optical directional coupler diverts a fixed amount of optical power determined by a coupling ratio of the optical directional coupler from a trunk to a branch or tap location. Optical directional couplers are used for signal distribution of optical signals in a variety of distribution topologies, such as in a daisy chain topology. FIG. 1 illustrates an optical daisy chain power distribution system based on optical directional couplers. The optical directional couplers 102 are configured in a daisy chain topology where each optical directional coupler 102 diverts an amount of power from the main trunk 104 to a respective tap 106. In most daisy chain networks it is required to have an equal power at each tap. Because conventional optical directional couplers have a fixed coupling ratio (e.g., 3 db, 6 db, 10 db, etc.), design and configuration of a daisy chain can be very complicated, and in most cases less than optimal. In this regard, as an amount of power is removed from the main trunk 104 by each optical directional coupler 102, there is less optical power reaching each subsequent optical directional coupler 102 in the daisy chain. Accordingly, in order for each respective tap 106 to have an equal power, each optical directional coupler 102 in the daisy chain must typically have a different coupling ratio, thus introducing complications in the design and configuration of a daisy chain using conventional optical directional couplers. Moreover, as, in some instances, it may not be possible to determine the exact coupling ratio needed for a given tap position without experimentation, the time and associated costs required to deploy a daisy chain using conventional optical directional couplers can be prohibitive. As such, network topologies using conventional optical directional couplers are often practically limited in terms of daisy chain length and/or the number of taps. This limitation can increase the amount of fiber required in an overall network deployment, as the limitation on daisy chain length can increase the number of trunk lines needed to accommodate the required amount of taps in the network.

Various example embodiments disclosed herein provide a voltage controlled optical coupler that can address the design limitations inherent with usage of conventional optical directional couplers. In this regard, the coupling ratio of a voltage controlled optical coupler disclosed herein can be adjusted through voltage tuning to achieve a desired tap output power. As such, voltage tuned optical directional couplers disclosed herein can reduce design complications in deployment of daisy chain topologies, allowing for deployment of longer daisy chains having more taps than possible when using conventional optical directional couplers. Moreover, the increased daisy chain length possible with use of voltage controlled optical couplers disclosed herein can reduce the amount of fiber needed for an overall network deployment, thus reducing costs for network deployment.

Figure 2A:
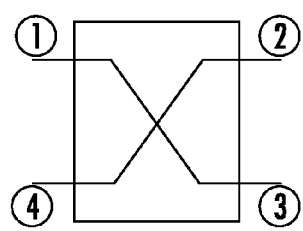
FIGS. 2A-2D illustrates the operation of an optical hybrid coupler.

FIGS. 2A-2D illustrate the operation of an optical hybrid coupler, also referred to as an optical hybrid combiner, which may be used in a voltage controlled optical directional coupler in accordance with various example embodiments. The transfer function of a basic optical hybrid coupler as shown in FIG. 2A can be described by the following transfer matrix:

$$T := \left(\frac{-1}{2}\right) \cdot \begin{pmatrix} 0 & J & 1 & 0 \\ J & 0 & 0 & 1 \\ 1 & 0 & 0 & J \\ 0 & 1 & J & 0 \end{pmatrix}$$

In this operation, Ports 2 and 3 are assumed to have identical reflectors with reflection coefficient $\Gamma$, and optical power with a magnitude of P is injected to port 4. According to the transfer matrix, the optical power at port 2 will be one half of the input power and with an angle of 180 degrees, and the optical power at port 3 will be one half of the input power with an angle of 270 degrees (referring to the input). In this example, the phase shift between port 2 and port 3 optical powers is 90 degrees.

Figure 2B:
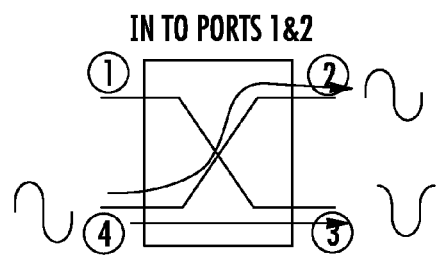

Since Ports 2 and 3 have identical reflectors with a reflection coefficient of $0<\Gamma<1$, the same amount of optical power will be reflected from port 2 and port 3, as illustrated in FIG. 2B.

Figure 2C:
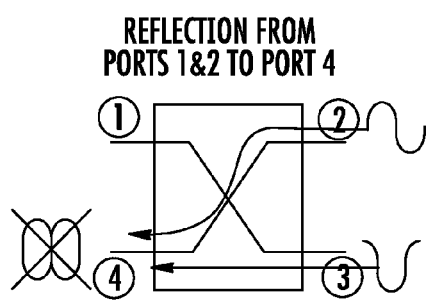
Figure 2D:
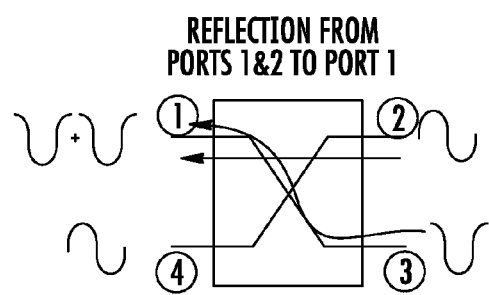

In a case where the reflected waves from ports 2 and 3 returns to port 4, (input port) the waves will return in a 180 degree phase shift between of them, and they will cancel each other as illustrated in FIG. 2C. In a case where one of the reflected waves from ports 2 and 3 returns to port 1, (output port) the waves will return in a 0° phase shift between them and they will sum, as illustrated in FIG. 2D. In a case of balanced reflectors in ports 2 and 3, the reflection will return to port 1 only. Since the reflection coefficient of the reflector $$\Gamma = \frac{P^-}{P^+},$$

the magnitude of the reflected power to port 1 is $P_{PORT1} = \Gamma \cdot P^+$.

Figure 3:
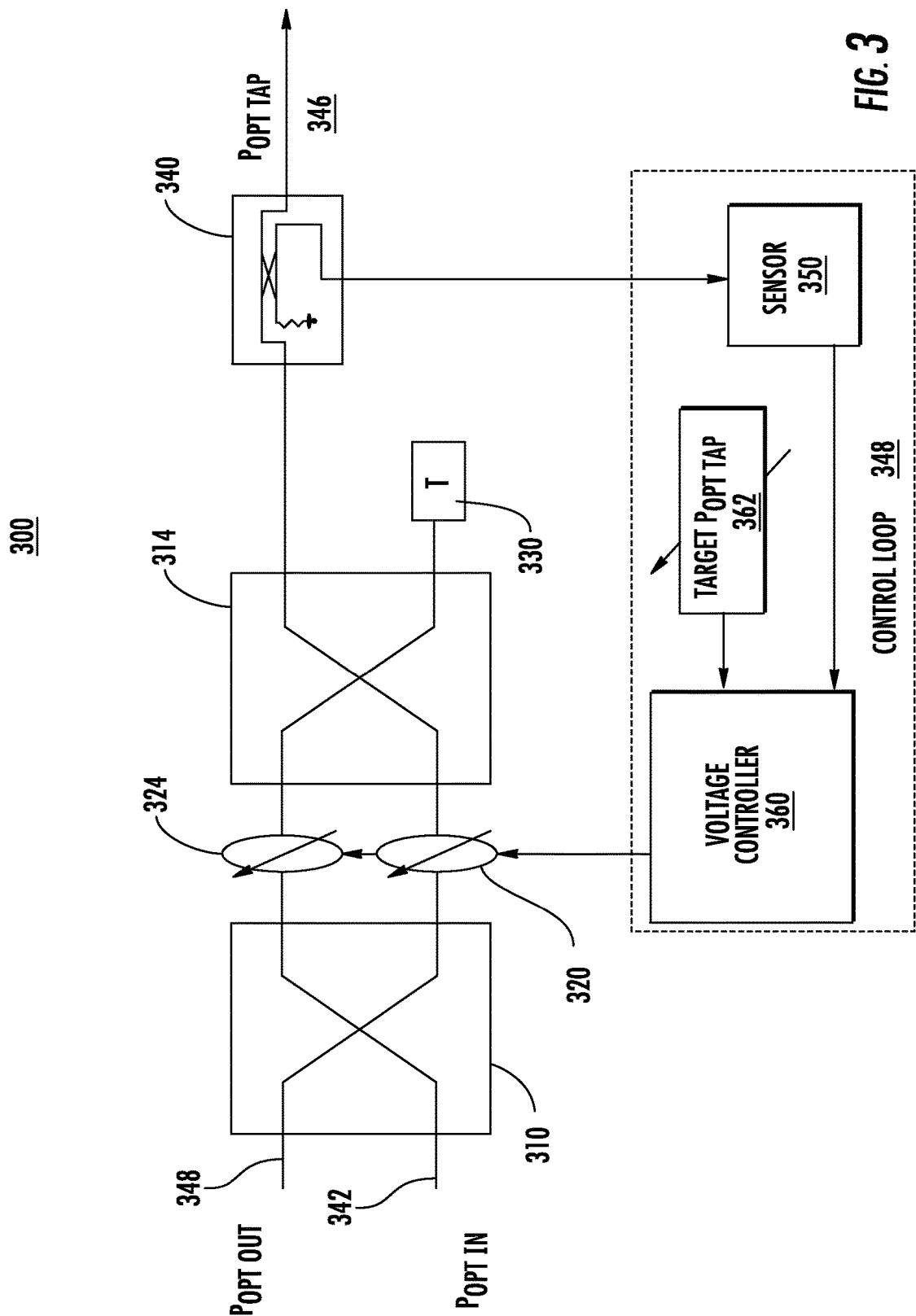
FIG. 3 is a block diagram of a VCODC according to some example embodiments.

FIG. 3 is a block diagram of a VCODC) 300 according to some example embodiments. The VCODC 300 has a coupling ratio that can be adjusted to any required coupling ratio through voltage tuning.

The VCODC 300 may include a first optical hybrid coupler 310 and a second optical hybrid coupler 314, which may be coupled (e.g., connected back-to-back) via one or more voltage controlled optical elements. The first optical hybrid coupler 310 and the second optical hybrid coupler 314 are coupled via two such voltage controlled optical elements—a first voltage controlled optical element 320 and a second voltage controlled optical element 324. It will be appreciated that while two voltage controlled optical elements are illustrated by way of example in FIG. 3, other arrangements are contemplated within the scope of the disclosure. For example, a single voltage controlled optical element may be used to span both coupled sets of ports between the first optical hybrid coupler 310 and the second optical hybrid coupler 314. As such, where reference is made herein to the first voltage controlled optical element 320 and the second voltage controlled optical element 324, it will be appreciated that such reference is by way of example, and not by way of limitation, such that other arrangements involving one or more voltage controlled optical elements may be substituted mutatis mutandis for the first voltage controlled optical element 320 and the second voltage controlled optical element 324 within the scope of the disclosure.

The voltage controlled optical element(s) (e.g., the first voltage controlled optical element 320 and the second voltage controlled optical element 324) used to couple the first optical hybrid coupler 310 and the second optical hybrid coupler 314 may be implemented via any optical element having a variable transparency depending on a voltage applied to the one voltage controlled optical elements. For example, a lens, such as a voltage controlled optical reflector may be used to implement the first voltage controlled optical element 320 and/or the second voltage controlled optical element 324.

An optical termination 330, such as may include black or opaque structure, may be connected to the lower output of the second optical hybrid coupler 314. The other port of the second optical hybrid coupler 324 may be coupled with a tap output of the VCODC 300. In the embodiment illustrated in FIG. 3, the second optical hybrid coupler 324 may be coupled with an optical coupler 340, which may provide the tap output 346 of the VCODC 300.

The first optical hybrid coupler 310 may include and/or otherwise be coupled with a trunk input 342, which may receive an input optical power, $P_{OPT\ IN}$. The VCODC 300 may be configured to divert a portion of power received to the tap input 342 (e.g., a portion of $P_{OPT\ IN}$) to the tap output 346. The portion of optical power diverted to the tap output 346 may be referred to as $P_{OPT\ TAP}$. The portion of optical power received to the trunk input 342 that is not diverted to the tap output 346 may be passed through to the trunk output 348, and may be referred to as $P_{OPT\ OUT}$.

The optical power value of $P_{OPT\ OUT}$ our at the trunk output 348 varies with the coupling ratio of the VCODC 300, and may be described by the following equation:

$$P_{OPT\ OUT} = \Gamma \cdot P^+,$$

where the reflection coefficient $\Gamma$ is correlated to the voltage controlled transparency of the voltage controlled optical element(s) (e.g., the first voltage controlled optical element 320 and the second voltage controlled optical element 324) used to couple the first optical hybrid coupler 310 and the second optical hybrid coupler 314.

The optical power value of $P_{OPT\ TAP}$ likewise varies with the coupling ratio of the VCODC 300, and may be described by the following equation:

$$P_{OPT\ TAP} = P_{OPT\ IN} \cdot (1-\Gamma).$$

The VCODC 300 may further include and/or otherwise be coupled with a control loop 348. The control loop 348 may be configured to adjust the variable coupling ratio of the VCODC 300 to maintain and/or otherwise achieve a target $P_{OPT\ TAP}$ by tuning the voltage applied to the first voltage controlled optical element 320 and the second voltage controlled optical element 324 in an instance in which an actual $P_{OPT\ TAP}$ observed during operation of the VCODC 300 is not equal to the target $P_{OPT\ TAP}$. In this regard, the control loop 348 may be configured to tune the voltage applied to the first voltage controlled optical element 320 and the second voltage controlled optical element 324 to increase transparency of the first voltage controlled optical element 320 and the second voltage controlled optical element 324 in an instance in which the observed $P_{OPT\ TAP}$ is less than the target $P_{OPT\ TAP}$, and may be configured to tune the voltage applied to the first voltage controlled optical element 320 and the second voltage controlled optical element 324 to decrease transparency of the first voltage controlled optical element 320 and the second voltage controlled optical element 324 in an instance in which the observed $P_{OPT\ TAP}$ is greater than the target $P_{OPT\ TAP}$.

The control loop 348 of some example embodiments may include a sensor 350 and a voltage controller 360. The sensor 350 may be embodied as any sensor configured to sense an actual $P_{OPT\ TAP}$ during operation of the VCODC 300 and to generate a correction signal indicative of the value of the actual $P_{OPT\ TAP}$. The correction signal may comprise a correction voltage having a value corresponding to the optical power of the actual $P_{OPT\ TAP}$ observed by the sensor 350. For example, such as that illustrated in and described below with respect to FIG. 4, the sensor 350 may be implemented as a photodiode, which may be positioned such that it may be illuminated by the tap output 346 (e.g., by output of the optical coupler 340), and may be configured to generate a correction voltage based on the illumination.

The correction signal generated by the sensor 350 may be passed to the voltage controller 360. The voltage controller 360 may also be provided with an indication of a target $P_{OPT\ TAP}$ value 362. The target $P_{OPT\ TAP}$ value 362 may be a tunable threshold, or setpoint, that may be adjusted based on a desired $P_{OPT\ TAP}$ value. In some example embodiments, such as that illustrated in and described below with respect to FIG. 5, the target $P_{OPT\ TAP}$ value 362 may be controlled by processing circuitry, which may be configured to control one or more VCODCs 300 implemented within a network.

The voltage controller 360 may be embodied as any circuit that may be configured to tune the voltage supplied to the first voltage controlled optical element 320 and the second voltage controlled optical element 324 based on the correction signal received from the sensor 350 to achieve the target $P_{OPT\ TAP}$ value 362. In this regard, the voltage controller 360 may be configured to tune the voltage applied to the first voltage controlled optical element 320 and the second voltage controlled optical element 324 to increase transparency of the first voltage controlled optical element 320 and the second voltage controlled optical element 324 in an instance in which the observed $P_{OPT\ TAP}$ is less than the target $P_{OPT\ TAP}$. In some embodiments, increasing the transparency of the first voltage controlled optical element 320 and the second voltage controlled optical element 324 may also decrease a reflectivity of the first voltage controlled optical element 320 and the second voltage controlled optical element 324. The voltage controller 360 may be further configured to tune the voltage applied to the first voltage controlled optical element 320 and the second voltage controlled optical element 324 to decrease transparency of the first voltage controlled optical element 320 and the second voltage controlled optical element 324 in an instance in which the observed $P_{OPT\ TAP}$ is greater than the target $P_{OPT\ TAP}$. Decreasing the transparency of the first voltage controlled optical element 320 and the second voltage controlled optical element 324 may also increase a reflectivity of the first voltage controlled optical element 320 and the second voltage controlled optical element 324. The voltage controller 360 may accordingly be configured to close the control loop 348 by producing a voltage fed to the first voltage controlled optical element 320 and the second voltage controlled optical element 324.

In some embodiments, such as that illustrated in and described with respect to FIG. 4 below, the voltage controller 360 may comprise a loop filter. In such embodiments, the control signal that may be received from the sensor 350 may be a correction voltage, such as may be supplied by a photodiode, and the indication of the target $P_{OPT\ TAP}$ value 362 that may be supplied to the voltage controller 360 may be a threshold voltage (e.g., a reference voltage) corresponding to the target $P_{OPT\ TAP}$. The voltage controller 360 may be configured to tune the voltage supplied to the first voltage controlled optical element 320 and the second voltage controlled optical element 324 based on a relationship between the correction voltage and the threshold voltage. In this regard, if the correction voltage and the threshold voltage are not equal, the voltage controller 360 may tune the voltage supplied to the first voltage controlled optical element 320 and the second voltage controlled optical element 324 until the correction voltage is substantially equivalent to the threshold voltage.

Accordingly the coupling ratio of the VCODC 300 can be adjusted through voltage tuning to achieve a target $P_{OPT\ TAP}$, which may be required and/or otherwise desired for deployment within a network topology. As such, a substantially constant $P_{OPT\ TAP}$ may be maintained by the VCODC 300. According to one aspect, the VCODC 300 can be used to build optimized, easy to design daisy chain networks with reduced (e.g., minimal) power loss compared to conventional optical directional couplers.

Figure 4:
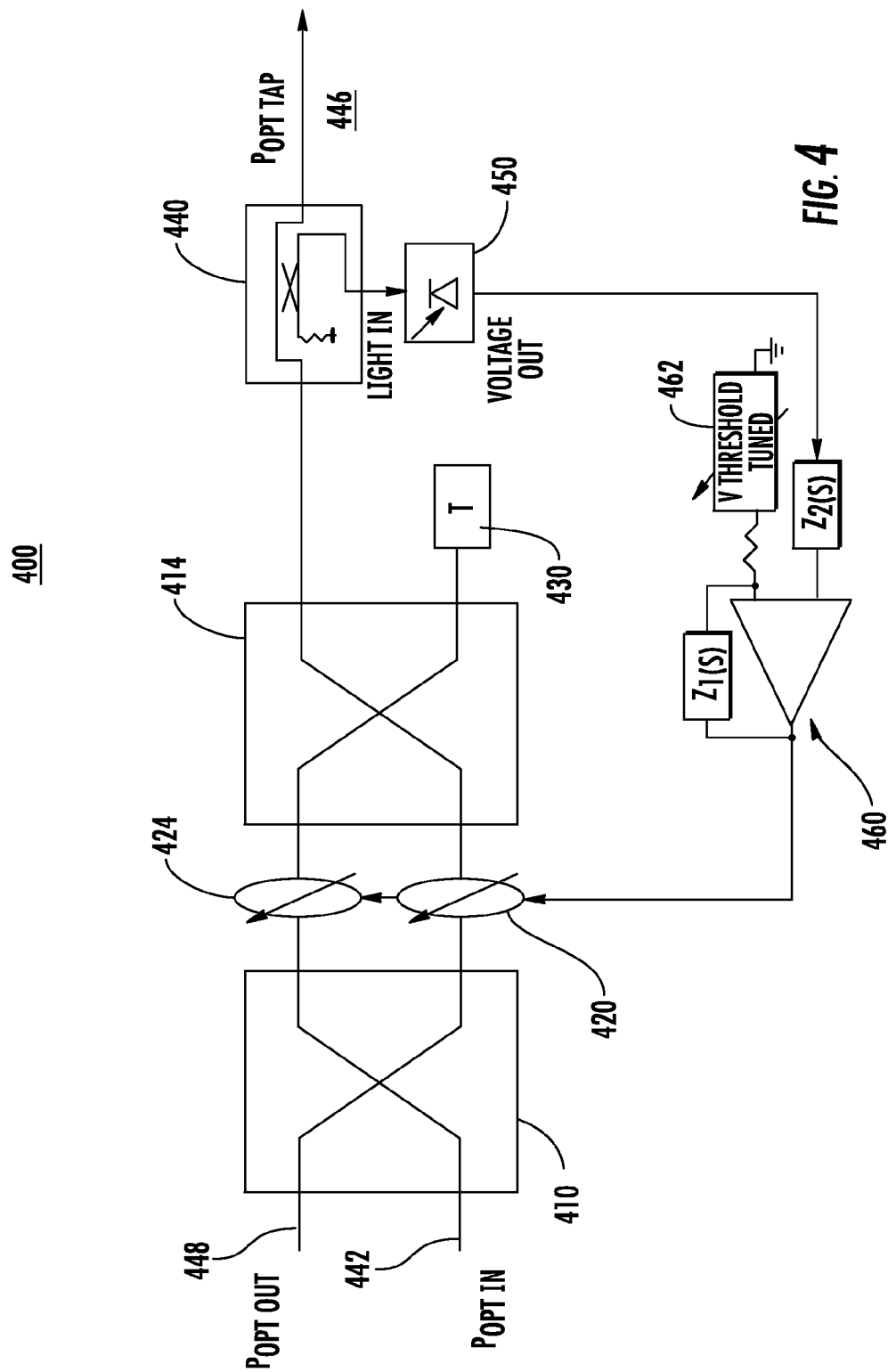
FIG. 4 is a block diagram of another VCODC according to some example embodiments.

FIG. 4 is a block diagram of another VCODC 400 according to some example embodiments. In this regard, the VCODC 400 can be an embodiment of the VCODC 300. In accordance with some embodiments, the VCODC 400 has a coupling ratio that can be adjusted to any required coupling ratio through voltage tuning.

The VCODC 400 may include a first optical hybrid coupler 410 and a second optical hybrid coupler 414, which may, respectively, be embodiments of the first optical hybrid coupler 310 and the second optical hybrid coupler 314. The first optical hybrid coupler 410 and the second optical hybrid coupler 414 may be coupled (e.g., connected back-to-back) via a first voltage controlled optical reflector 420 and a second voltage controlled optical reflector 424. The first voltage controlled optical reflector 420 and the second voltage controlled optical reflector 424 may, for example, be embodiments of the first voltage controlled optical element 320 and the second voltage controlled optical element 324.

An optical termination 430, such as may include black or opaque structure, may be connected to the lower output of the second optical hybrid coupler 414. The other port of the second optical hybrid coupler 424 may be coupled with an optical coupler 440, which may provide the tap output 446 of the VCODC 400.

The first optical hybrid coupler 410 may include and/or otherwise be coupled with a trunk input 442, which may receive an input optical power, $P_{OPT\ IN}$. The VCODC 400 may be configured to divert a portion of power received to the tap input 442 (e.g., a portion of $P_{OPT\ IN}$) to the tap output 446. The portion of optical power diverted to the tap output 446 may be referred to as $P_{OPT\ TAP}$. The portion of optical power received to the trunk input 442 that is not diverted to the tap output 446 may be passed through to the trunk output 448, and may be referred to as $P_{OPT\ OUT}$.

Similarly to the VCODC 300, the optical power value of $P_{OPT\ OUT}$ at the trunk output 448 varies with the coupling ratio of the VCODC 400, and may be described by the following equation:

$$P_{OPT\ OUT} = \Gamma \cdot P^+,$$

where the reflection coefficient Γ is correlated to the voltage controlled transparency of the first voltage controlled optical reflector 420 and the second voltage controlled optical reflector 424.

The optical power value of $P_{OPT\ TAP}$ likewise varies with the coupling ratio of the VCODC 400, and may be described by the following equation:

$$P_{OPT\ TAP} = P_{OPT\ IN} \cdot (1-\Gamma).$$

The VCODC 400 may further include a photodiode 450 and a loop filter 460, which may form a control loop that may be configured to tune the voltage applied to the first voltage controlled optical reflector 420 and the second voltage controlled optical reflector 424 to tune $P_{OPT\ TAP}$ to a target value. The photodiode 450 may, for example, be an embodiment of the sensor 350. The loop filter 460 may, for example, be an embodiment of the voltage controller 360. In this regard, the photodiode 450 and the loop filter 460 may collectively form an embodiment of the control loop 348.

The output of the optical coupler 440 may illuminate the photo diode 450, which may be configured to produce a correction voltage related to the $P_{OPT\ TAP}$ observed via the output of the optical coupler 440. The generated correction voltage may be passed to the loop filter 460, which may also be supplied with a tunable threshold voltage 462 (e.g., a reference voltage), which may correspond to a target $P_{OPT\ TAP}$. In some example embodiments, such as that illustrated in and described below with respect to FIG. 5, the threshold voltage 462 may be supplied and/or otherwise controlled by processing circuitry, which may be configured to control one or more VCODCs 400 implemented within a network.

The loop filter 460 may be configured to tune the voltage applied to the first voltage controlled optical reflector 420 and the second voltage controlled optical reflector 424 based at least in part on the relationship between the threshold voltage 462 and the correction voltage produced by the photodiode 450. The loop filter 460 can accordingly close the control loop for the VCODC 400 by producing the voltage fed to the first voltage controlled optical reflector 420 and the second voltage controlled optical reflector 424 based on the relationship between the threshold voltage 462 and the correction voltage produced by the photodiode 450.

The coupling ratio of the VCODC 400 can accordingly be adjusted through voltage tuning to achieve a target $P_{OPT\ TAP}$, which may be required and/or otherwise desired for deployment within a network topology. According to one aspect, the VCODC 400 can be used to build optimized, easy to design daisy chain networks with reduced (e.g., minimal) power loss compared to conventional optical directional couplers.

Figure 5:
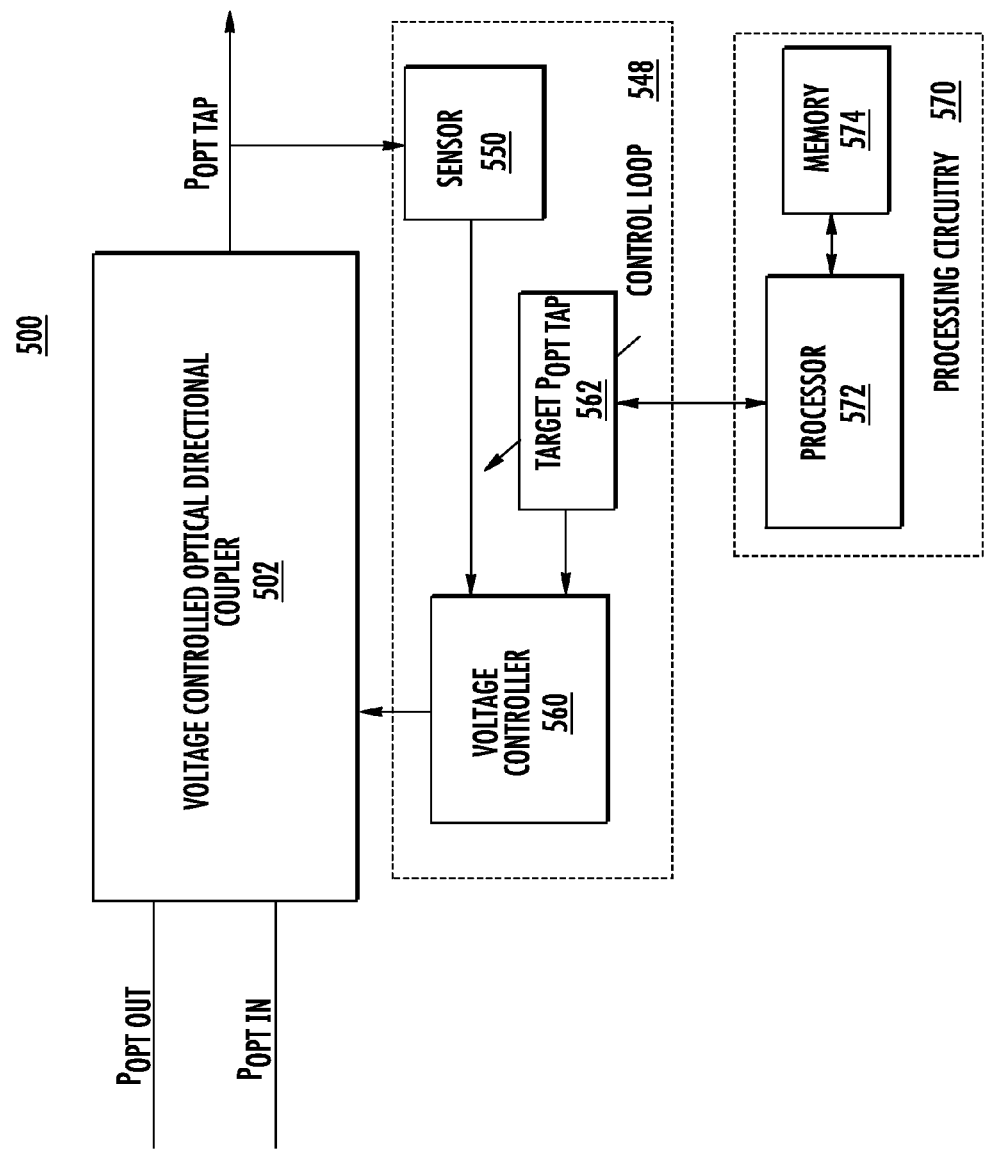
FIG. 5 is a block diagram of a system including a VCODC according to some example embodiments.

FIG. 5 is a block diagram of a system 500 including a VCODC 502 according to some example embodiments. The VCODC 502 may be embodied as any VCODC disclosed herein, such as the VCODC 300 or the VCODC 400. The VCODC 502 may include and/or otherwise be coupled with a control loop 548, which may, for example, comprise an embodiment of the control loop 348.

The control loop 548 may include a sensor 550 and a voltage controller 560. The sensor 550 may be configured to observe an actual $P_{OPT\ TAP}$ of the VCODC 502 and generate a correction signal indicative of the actual $P_{OPT\ TAP}$. In this regard, the sensor 550 may, for example, be an embodiment of the sensor 350. The voltage controller 560 may be configured to receive the correction signal generated by the sensor 550. The voltage controller 560 may also be supplied with a tunable indication of a target $P_{OPT\ TAP}$ 562, which may, for example, be a threshold voltage corresponding to the target $P_{OPT\ TAP}$. The voltage controller 560 may be configured to adjust a coupling ratio of the VCODC 502 through voltage tuning that may be performed based on the tunable indication of the target $P_{OPT\ TAP}$ 562 and the correction signal to achieve the target $P_{OPT\ TAP}$. In this regard, the voltage controller 560 may, for example, be an embodiment of the voltage controller 360.

The target $P_{OPT\ TAP}$ 562 may be supplied and/or otherwise controlled by processing circuitry 570. In some example embodiments, the processing circuitry 570 may include a processor 572 and, in some embodiments, such as that illustrated in FIG. 5, may further include memory 574.

The processor 572 may be embodied in a variety of forms. For example, the processor 572 may be embodied as various hardware processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 572 may comprise a plurality of processors. In some example embodiments, the processor 572 may be configured to execute instructions that may be stored in the memory 574 and/or that may be otherwise accessible to the processor 572. As such, whether configured by hardware or by a combination of hardware and software, the processor 572 may be configured to control the target $P_{OPT\ TAP}$ for one or more VCODCs 502 in accordance with various example embodiments.

In some example embodiments, the memory 574 may include one or more memory and/or other storage devices. Memory 574 may include fixed and/or removable memory devices. In some embodiments, the memory 574 may provide a non-transitory computer-readable storage medium that may store computer program instructions that may be executed by the processor 572. In this regard, the memory 574 may be configured to store information, data, applications, instructions and/or the like for enabling the processor 572 to control the target $P_{OPT\ TAP}$ for one or more VCODCs 502.

The system 500 may be implemented within a network topology including one or more VCODCs. For example, in some deployments, the system 500 may be implemented within a daisy chain topology including a plurality of VCODCs 502. The processing circuitry 570 in such deployments may be interfaced with the control loops of multiple VCODCs 502 to control the target $P_{OPT\ TAP}$ for each respective VCODC 502. In such deployments, the processing circuitry 570 may be configured to individually set a target $P_{OPT\ TAP}$ for each respective VCODC 502, or may be configured to set a universal target $P_{OPT\ TAP}$ for all of the VCODCs 502 depending on the particular network topology and/or other network design specifications/needs.

Figure 6:
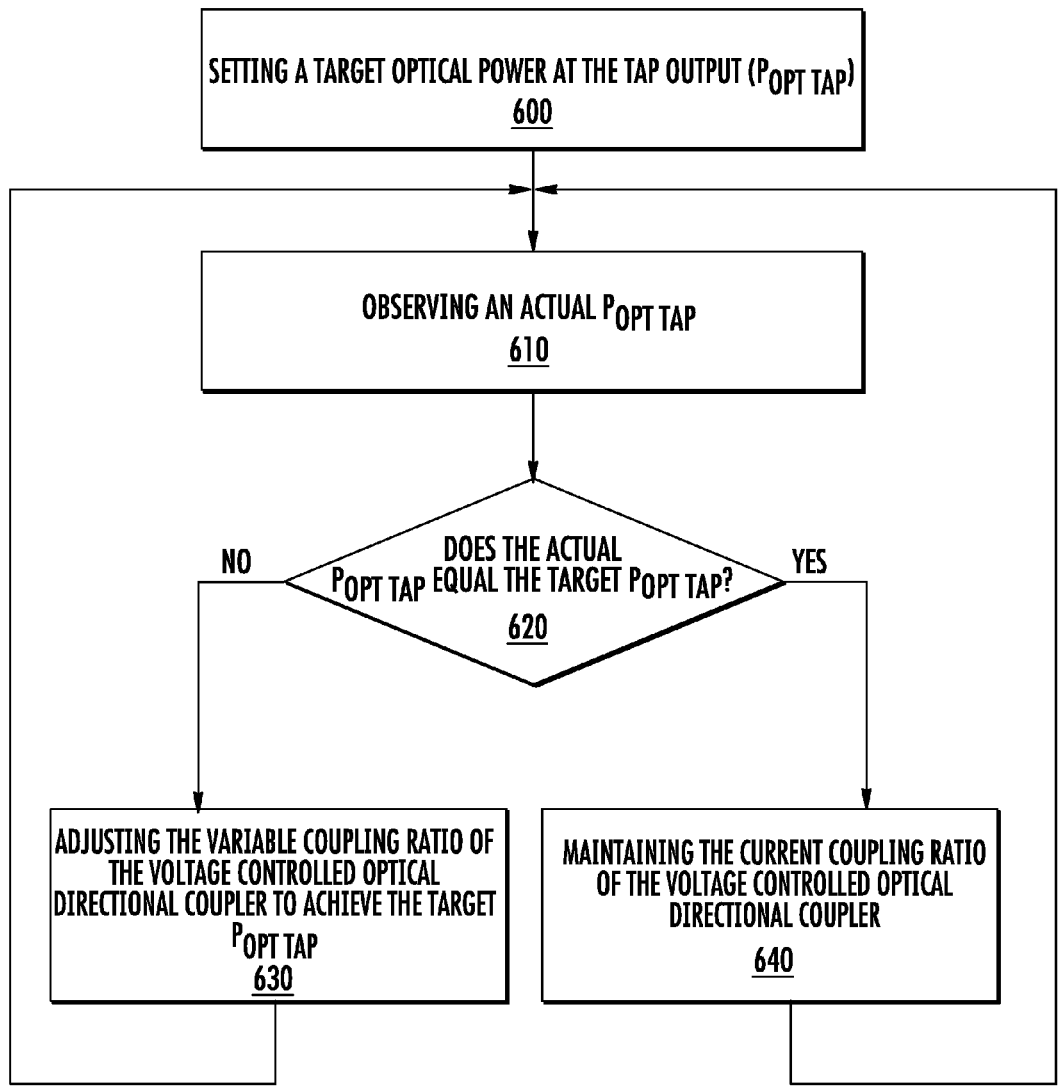
FIG. 6 illustrates a flowchart according to an example method for operating a VCODC according to some example embodiments.

FIG. 6 illustrates a flowchart according to an example method for operating a VCODC, such as VCODCs 300 400, and/or 500, having a variable coupling ratio.

Operation 600 may include setting a target optical power at the tap output ($P_{OPT\ TAP}$) for a VCODC, and may be performed by processing circuitry, such as circuitry 570. Operation 600 may include providing an indication of the target $P_{OPT\ TAP}$ to an element of a control loop, such as a voltage controller (e.g., voltage controller 360, loop filter 460, and/or voltage controller 560) as a setpoint to enable the control loop to adjust the coupling ratio of the VCODC to achieve the target $P_{OPT\ TAP}$. For example, operation 600 may include supplying a threshold, or reference, voltage corresponding to the target $P_{OPT\ TAP}$ to a voltage controller.

Operation 610 may include observing an actual $P_{OPT\ TAP}$ at the tap output of the VCODC. Operation 610 may be performed by a sensor, such as sensor 350, photodiode 450, and/or sensor 550, which may be implemented within the control loop. Operation 610 may include the sensor generating a correction signal indicative of the actual $P_{OPT\ TAP}$.

Operation 620 may include determining whether the actual $P_{OPT\ TAP}$ is equal to the target $P_{OPT\ TAP}$. Operation 620 may be performed by a voltage controller as, such voltage controller 360, loop filter 460, and/or voltage controller 560. Operation 620 may be performed based on a control signal indicative of the actual $P_{OPT\ TAP}$ that may be supplied to the voltage controller attendant to performance of operation 610. For example, in embodiments in which the correction signal is a correction voltage and the target $P_{OPT\ TAP}$ is indicated via a threshold voltage, operation 620 may be performed by determining a relationship between the correction voltage and the threshold voltage.

In an instance in which it is determined at operation 620 that the actual $P_{OPT\ TAP}$ does not equal the target $P_{OPT\ TAP}$, the method may proceed to operation 630, which may include the control loop adjusting the variable coupling ratio of the VCODC to achieve the target $P_{OPT\ TAP}$. In this regard, operation 630 may include tuning a voltage applied to one or more voltage controlled optical elements (e.g., voltage controlled optical elements 320, 324; voltage controlled optical reflectors 420, 424; and/or the like) within the voltage controlled optical coupler to increase transparency of the voltage controlled optical elements in an instance in which the actual $P_{OPT\ TAP}$ is less than the target $P_{OPT\ TAP}$, or to decrease transparency of the voltage controlled optical elements in an instance in which the actual $P_{OPT\ TAP}$ is greater than the target $P_{OPT\ TAP}$. Operation 630 may be performed by a voltage controller, such as voltage controller 360, loop filter 460, and/or voltage controller 560, which may be implemented within the control loop.

If, however, it is determined at operation 620 that the actual $P_{OPT\ TAP}$ is equal (e.g., substantially equal within a margin of error that may vary with design specifications) to the target $P_{OPT\ TAP}$, the method may instead proceed to operation 640, which may include maintaining the current coupling ratio of the VCODC.

In some embodiments, the method may return to operation 610 after performance of operation 630 and/or after operation 640. In this regard, operations 610-640 may be performed on an ongoing basis by the control loop during operation of the VCODC in order to maintain the target $P_{OPT\ TAP}$.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A voltage controlled optical directional coupler, comprising:
    a first optical hybrid coupler comprising a trunk input;
    a second optical hybrid coupler coupled with a tap output; and
    one or more voltage controlled optical elements configured to couple the first optical hybrid coupler to the second optical hybrid coupler, the one or more voltage controlled optical elements having a variable transparency depending on a voltage applied to the one or more voltage controlled optical elements;
    wherein the voltage controlled optical directional coupler is configured to divert a portion of optical power received to the trunk input to the tap output based on a variable coupling ratio of the voltage controlled optical directional coupler, the variable coupling ratio being dependent on the variable transparency of the one or more voltage controlled optical elements; wherein a first output of the second optical hybrid coupler is coupled to the tap output, a second output of the second hybrid optical coupler is coupled to an optical termination, and the voltage controlled optical directional coupler is configured to pass through to a trunk output of the first hybrid optical coupler a remaining portion of optical power received to the trunk input and not diverted to the tap output.

2. The voltage controlled optical directional coupler of claim 1, wherein the one or more voltage controlled optical elements comprise one or more voltage controlled optical reflectors.

3. The voltage controlled optical directional coupler of claim 1, further comprising:
a control loop configured to adjust the variable coupling ratio of the voltage controlled optical directional coupler to achieve a target optical power at the tap output ($P_{OPT\ TAP}$) by tuning the voltage applied to the one or more voltage controlled optical elements in an instance in which an observed $P_{OPT\ TAP}$ is not equal to the target $P_{OPT\ TAP}$.

4. The voltage controlled optical directional coupler of claim 3, wherein the control loop comprises:
a sensor configured to generate a correction signal indicative of the observed $P_{OPT\ TAP}$; and
a voltage controller configured to tune the voltage applied to the one or more voltage controlled optical elements based at least in part on the correction signal.

5. The voltage controlled optical directional coupler of claim 4, wherein the correction signal comprises a correction voltage, and wherein the voltage controller is configured to tune the voltage applied to the one or more voltage controlled optical elements based at least in part on a relationship between the correction voltage and a threshold voltage corresponding to the target $P_{OPT\ TAP}$.

6. The voltage controlled optical directional coupler of claim 5, wherein the voltage controller comprises a loop filter.

7. The voltage controlled optical directional coupler of claim 4, wherein the sensor comprises a photodiode, the photodiode being positioned to be illuminated by output from the tap output and being configured to generate a correction voltage based on illumination from the tap output, and wherein the correction signal comprises the correction voltage generated by the photodiode.

8. The voltage controlled optical directional coupler of claim 3, wherein the control loop is configured to tune the voltage applied to the one or more voltage controlled optical elements to increase transparency of the one or more voltage controlled optical elements in an instance in which the observed $P_{OPT\ TAP}$ is less than the target $P_{OPT\ TAP}$.

9. The voltage controlled optical directional coupler of claim 3, wherein the control loop is configured to tune the voltage applied to the one or more voltage controlled optical elements to decrease transparency of the one or more voltage controlled optical elements in an instance in which the observed $P_{OPT\ TAP}$ is greater than the target $P_{OPT\ TAP}$.

10. The voltage controlled optical directional coupler of claim 1, wherein the one or more voltage controlled optical elements comprises a plurality of voltage controlled optical elements.

11. The voltage controlled optical directional coupler of claim 1, wherein the second optical hybrid coupler is coupled to a separate optical coupler, which is configured to provide the tap output.

12. The voltage controlled optical directional coupler of claim 1, wherein at least one of the first optical hybrid coupler and the second optical hybrid coupler comprises four ports, a second port and a third port of the four ports having identical reflectors having reflection coefficient Γ, and wherein, when an optical power with a magnitude of P is injected to a fourth port, an optical power at a second port will be one half of the input power and with an angle of 180 degrees, and the optical power at a third port will be one half of the input power with an angle of 270 degrees, and a same amount of optical power will be reflected from the second port and the third port.

13. A method for operating a voltage controlled optical directional coupler comprising:
a first optical hybrid coupler comprising a trunk input; and
a second optical hybrid coupler coupled with a tap output of the voltage controlled optical directional coupler, the first optical hybrid coupler being coupled with the second optical hybrid coupler via one or more voltage controlled optical elements having a variable transparency depending on a voltage applied to the one or more voltage controlled optical elements, the method comprising:
setting a target optical power at the tap output ($P_{OPT\ TAP}$) for the voltage controlled optical directional coupler, wherein a portion of optical power received to the trunk input is diverted to the tap output based on a variable coupling ratio of the voltage controlled optical directional coupler, the variable coupling ratio being dependent on the variable transparency of the one or more voltage controlled optical elements;
observing an actual $P_{OPT\ TAP}$;
determining whether the actual $P_{OPT\ TAP}$ is equal to the target $P_{OPT\ TAP}$; and
adjusting the variable coupling ratio of the voltage controlled optical directional coupler to achieve the target $P_{OPT\ TAP}$ by tuning the voltage applied to the one or more voltage controlled optical elements in an instance in which the actual $P_{OPT\ TAP}$ is not equal to the target $P_{OPT\ TAP}$; and passing through to a trunk output of the first hybrid optical coupler a remaining portion of optical power received to the trunk input and not diverted to the tap output.

14. The method of claim 13, wherein adjusting the variable coupling ratio of the voltage controlled optical directional coupler comprises:
tuning the voltage applied to the one or more voltage controlled optical elements to increase transparency of the one or more voltage controlled optical elements in an instance in which the actual $P_{OPT\ TAP}$ is less than the target $P_{OPT\ TAP}$; and
tuning the voltage applied to the one or more voltage controlled optical elements to decrease transparency of the one or more voltage controlled optical elements in an instance in which the actual $P_{OPT\ TAP}$ is greater than the target $P_{OPT\ TAP}$.

15. The method of claim 13, wherein:
observing the actual $P_{OPT\ TAP}$ comprises a sensor detecting the actual $P_{OPT\ TAP}$ and generating a correction signal indicative of the actual $P_{OPT\ TAP}$; and
adjusting the variable coupling ratio of the voltage controlled optical directional coupler comprises a voltage controller tuning the voltage applied to the one or more voltage controlled optical elements based at least in part on the correction signal.

16. The method of claim 15, wherein the correction signal comprises a correction voltage, and wherein adjusting the variable coupling ratio of the voltage controlled optical directional coupler comprises the voltage controller tuning the voltage applied to the one or more voltage controlled optical elements based at least in part on a relationship between the correction voltage and a threshold voltage corresponding to the target $P_{OPT\ TAP}$.

17. The method of claim 13, wherein:
setting the target $P_{OPT\ TAP}$ comprises providing a target voltage corresponding to the target $P_{OPT\ TAP}$ to a control loop; and
adjusting the variable coupling ratio of the voltage controlled optical directional coupler comprises the control loop tuning the voltage applied to the one or more voltage controlled optical elements.

18. The method of claim 13, wherein setting the target $P_{OPT\ TAP}$ comprises processing circuitry setting the target $P_{OPT\ TAP}$ for the voltage controlled optical directional coupler.

19. A system comprising:
a voltage controlled optical directional coupler comprising:
a first optical hybrid coupler comprising a trunk input;
a second optical hybrid coupler coupled with a tap output; and
one or more voltage controlled optical elements configured to couple the first optical hybrid coupler to the second optical hybrid coupler, the one or more voltage controlled optical elements having a variable transparency depending on a voltage applied to the one or more voltage controlled optical elements;
wherein the voltage controlled optical directional coupler is configured to divert a portion of optical power received to the trunk input to the tap output based on a variable coupling ratio of the voltage controlled optical directional coupler, the variable coupling ratio being dependent on the variable transparency of the one or more voltage controlled optical elements;
a control loop configured to adjust the variable coupling ratio of the voltage controlled optical directional coupler to achieve a target optical power at the tap output ($P_{OPT\ TAP}$) by tuning the voltage applied to the one or more voltage controlled optical elements in an instance in which an observed $P_{OPT\ TAP}$ is not equal to the target $P_{OPT\ TAP}$; and
processing circuitry configured to set the target $P_{OPT\ TAP}$;
wherein a first output of the second optical hybrid coupler is coupled to the tap output, a second output of the second hybrid optical coupler is coupled to an optical termination, and the voltage controlled optical directional coupler is configured to pass through to a trunk output of the first hybrid optical coupler a remaining portion of optical power received to the trunk input and not diverted to the tap output.

20. The system of claim 19, wherein the control loop is configured to:
tune the voltage applied to the one or more voltage controlled optical elements to increase transparency of the one or more voltage controlled optical elements in an instance in which the observed $P_{OPT\ TAP}$ is less than the target $P_{OPT\ TAP}$; and
tune the voltage applied to the one or more voltage controlled optical elements to decrease transparency of the one or more voltage controlled optical elements in an instance in which the observed $P_{OPT\ TAP}$ is greater than the target $P_{OPT\ TAP}$.

21. The system of claim 19, wherein the control loop comprises:
a sensor configured to generate a correction signal indicative of the observed $P_{OPT\ TAP}$; and
a voltage controller configured to tune the voltage applied to the one or more voltage controlled optical elements based at least in part on the correction signal.

22. The system of claim 21, wherein the correction signal comprises a correction voltage, and wherein:
the processing circuitry is configured to set a threshold voltage corresponding to the target $P_{OPT\ TAP}$; and
the voltage controller is configured to tune the voltage applied to the one or more voltage controlled optical elements based at least in part on a relationship between the correction voltage and the threshold voltage.

23. The system of claim 22, wherein the sensor comprises a photodiode, the photodiode being positioned to be illuminated by output from the tap output and being configured to generate the correction voltage based on illumination from the tap output.

* * * * *